United States Patent
Bengtsson et al.

(10) Patent No.: US 11,418,241 B2
(45) Date of Patent: Aug. 16, 2022

(54) METHODS AND DEVICES FOR CONFIGURING MULTIPLE INPUT MULTIPLE OUTPUT WIRELESS TRANSMISSION

(71) Applicant: SONY GROUP CORPORATION, Tokyo (JP)

(72) Inventors: Erik Bengtsson, Eslöv (SE); Fredrik Rusek, Eslöv (SE)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/047,051

(22) PCT Filed: Apr. 16, 2019

(86) PCT No.: PCT/EP2019/059815
§ 371 (c)(1),
(2) Date: Oct. 12, 2020

(87) PCT Pub. No.: WO2019/201928
PCT Pub. Date: Oct. 24, 2019

(65) Prior Publication Data
US 2021/0203390 A1    Jul. 1, 2021

(30) Foreign Application Priority Data
Apr. 16, 2018  (SE) .................................. 1830127-5

(51) Int. Cl.
*H04B 7/06*    (2006.01)
*H04B 7/0456*    (2017.01)
(Continued)

(52) U.S. Cl.
CPC ......... *H04B 7/0486* (2013.01); *H04B 7/0617* (2013.01); *H04B 7/0634* (2013.01); *H04B 7/086* (2013.01); *H04L 5/0048* (2013.01)

(58) Field of Classification Search
CPC .. H04B 7/0486; H04B 7/0617; H04B 7/0634; H04B 7/086; H04B 7/0456; H04B 7/0413; H04L 5/0048
See application file for complete search history.

(56) References Cited

U.S. PATENT DOCUMENTS

2009/0290563 A1   11/2009  Gu et al.
2010/0002801 A1*  1/2010   Jia .................... H04B 7/0465
                                                         375/296
(Continued)

FOREIGN PATENT DOCUMENTS

CN    107070510 A    8/2017
EP    1850507 A2    10/2007
(Continued)

OTHER PUBLICATIONS

International Search Report and Written Opinion from corresponding International Application No. PCT/EP2019/059815, dated Jul. 3, 2019, 17 pages.
(Continued)

*Primary Examiner* — Minh Trang T Nguyen
(74) *Attorney, Agent, or Firm* — Tucker Ellis LLP (57) ABSTRACT

Methods (10) and devices (20; 30) for configuring multiple input multiple output, MIMO, wireless transmissions are provided. The method (10) comprises: participating (11), by a first network node (20), in a MIMO wireless transmission between a first network node (20) and a second network node 30 of a wireless network (20, 30), the wireless transmission being associated with a spatial channel matrix (40); while participating (11) in the MIMO wireless transmission: identifying (12), by the first network node (20) and in the spatial channel matrix (40), at least one spatial channel sub-matrix (41) having full rank; determining (13), by the first network node (20) and for each identified spatial channel sub-matrix (41), a candidate transmit configuration
(Continued)

for the second network node (30); selecting (14), by the first network node (20) and from the determined candidate transmit configurations, a transmit configuration for the second network node (30); and configuring (15), by the first network node (20), the second network node (30) to use the transmit configuration.

20 Claims, 4 Drawing Sheets

(51) Int. Cl.
*H04B 7/08* (2006.01)
*H04L 5/00* (2006.01)

(56) References Cited

U.S. PATENT DOCUMENTS

| 2014/0051377 | A1 | 2/2014 | Wang et al. |
| 2016/0134340 | A1 | 5/2016 | Pan et al. |
| 2017/0117943 | A1 | 4/2017 | Rahman et al. |
| 2019/0296819 | A1* | 9/2019 | Jiang .................. H04B 7/0697 |

FOREIGN PATENT DOCUMENTS

| EP | 2375604 | A1 | 10/2011 |
| JP | 2009510898 | A | 3/2009 |
| JP | 2012513149 | A | 6/2012 |
| JP | 2013179497 | A | 9/2013 |
| JP | 2013229909 | A | 11/2013 |
| JP | 2017516429 | A | 6/2017 |
| WO | 2011020439 | A1 | 2/2011 |

OTHER PUBLICATIONS

Chinese Office Action dated Jan. 26, 2022 for Application Serial No. 201980025543 (11 pages).

\* cited by examiner

METHODS AND DEVICES FOR CONFIGURING MULTIPLE INPUT MULTIPLE OUTPUT WIRELESS TRANSMISSION

FIELD OF THE INVENTION

Various embodiments of the invention relate to methods and devices for configuring multiple input multiple output, MIMO, wireless transmissions.

BACKGROUND OF THE INVENTION

3GPP 5G standardization associated with spectrum bands in a millimeter wave range, e.g. above 6 GHz, has to deal with new challenges. For instance, transmission at these bands suffers from much higher path loss. This may be overcome by way of MIMO wireless transmission, which enables highly directional beams that focus transmitted radio frequency energy, and in addition enable spatial reuse.

Due to the small wavelengths involved, even small environmental variations can change transmission performance significantly. This stresses the importance of beam management, which strives to optimize transmission performance by aligning the directional beams of endpoints of MIMO wireless transmissions.

Straightforwardly, each endpoint would be expected to select a directional beam yielding a strongest channel response.

BRIEF SUMMARY OF THE INVENTION

For endpoints capable of simultaneous transmission via multiple beams, further performance improvement can be achieved.

Accordingly, there is a continued need in the art for improvements and in MIMO wireless transmission to further optimize transmission performance.

These underlying objects of the invention are each solved by methods and devices as defined by the independent claims. Preferred embodiments of the invention are set forth in the dependent claims.

According to a first aspect, a method is provided. The method comprises: participating, by a first network node, in a multiple input multiple output, MIMO, wireless transmission between the first network node and a second network node of a wireless network, the wireless transmission being associated with a spatial channel matrix; while participating in the MIMO wireless transmission: identifying, by the first network node and in the spatial channel matrix, at least one spatial channel sub-matrix having full rank; determining, by the first network node and for each identified spatial channel sub-matrix, a candidate transmit configuration for the second network node; selecting, by the first network node and from the determined candidate transmit configurations, a transmit configuration for the second network node; and configuring, by the first network node, the second network node to use the transmit configuration.

Advantageously, the method optimizes a performance of the MIMO wireless transmission by providing the second network node with an optimum transmit configuration for diversity reception by the first network node. For instance, the first network node may be a user equipment, and the second network node may be a base station in a wireless mobile network.

In particular, a spatial channel sub-matrix 41 having full rank enables the MIMO wireless transmission to be performed at its maximum possible transmission capacity. In case of a rank deficient spatial channel sub-matrix 41, known reversion methods to other MIMO wireless transmission modes may apply.

The term "multiple input multiple output" or "MIMO" as used herein may refer to exploiting multipath propagation between multiple transmit and receive antennas in radio transmission.

MIMO wireless transmission may be used to increase transmission capacity, by dividing data into separate streams being transmitted simultaneously over the same air interface. When the individual streams are assigned to different network nodes, this is called Multi-User MIMO, MU-MIMO. When the individual streams are assigned to a single network node, this is called Single-User MIMO, SU-MIMO, and may refer to exploiting multipath propagation in a single link between a transmit phased antenna array and a receive phased antenna array to multiply transmission capacity.

The term "phased antenna array" as used herein may refer to an antenna array whose antennas transmit or receive a plurality of radio waves having relative amplitudes and phases such that a pattern of constructive and destructive interference forms a directional wavefront, i.e., a beam having a particular direction of propagation, without moving the antennas.

The term "spatial channel matrix" as used herein may refer to a tabular arrangement of complex values respectively describing a signal propagation between a corresponding pair of transmit and receive beams formable in the MIMO wireless transmission. For illustration, a matrix entry $h_{mn}$ in a spatial channel matrix $H_{M \times N}$ may represent a relative gain and phase associated with transmit beam n and receive beam m.

The term "sub-matrix" as used herein may refer to a matrix having at least the dimensions of 2×2 and at most the dimensions of an underlying matrix.

The term "transmit configuration" as used herein may refer to information comprising a set of transmit beams and a corresponding pre-coding configuration.

According to some embodiments, the participating in the MIMO wireless transmission between the first and second network nodes of the wireless network may comprise populating matrix entries of the spatial channel matrix according to a respective signal propagation between a corresponding pair of transmit and receive beams formable in the MIMO wireless transmission.

For illustration, the second network node may perform a transmit beam sweep in such a way that enables the first network node to perform corresponding receive beam sweeps and to detect any beam pair.

According to some embodiments, a number of columns of the at least one spatial channel sub-matrix may correspond to a number of receive chains of the first network node.

According to some embodiments, a number of columns of the at least one spatial channel sub-matrix may correspond to a number of transmit chains of the first network node.

The term "chain" as used herein may refer to a cascade of radio frequency, RF, signal processing functions dedicated to a particular antenna of a phased antenna array.

Advantageously, based on the definition of the spatial channel matrix mentioned above and depending on an orientation of MIMO wireless transmission, the at least one spatial channel sub-matrix having as many columns as the first network node has receive or transmit chains enables the MIMO wireless transmission to be performed at maximum throughput.

According to some embodiments, the transmit configuration may be indicative of a precoding configuration of the second network node comprising at least one of an amplitude, a phase and a polarization of transmit beams suggested for use by the second network node.

Advantageously, this may prevent transmit beams from mutual cancellation.

According to some embodiments, configuring the network node may further comprise communicating, by the first network node and to the second network node, the transmit configuration.

According to some embodiments, communicating the transmit configuration may comprise an explicit signaling of the transmit configuration.

Advantageously, this may enable suggesting relative power and phase values for different transmit beams of the second network node, which values may or may not be retrievable from a lookup table.

According to some embodiments, communicating the transmit configuration may comprise an implicit signaling of the transmit configuration using pilot transmissions, by the first network node, in respective directions of transmit beams suggested for use by the second network node.

Advantageously, this may enable the second network node to extract relative amplitudes and phases from the pilot transmissions.

In particular, this may involve Sounding Reference Signal, SRS, resources that correspond to a minimum of a number of receive chains, or a number of receive beams of the first network node.

According to some embodiments, communicating the transmit configuration may further comprise performing the pilot transmissions at least partially sequentially, if a number of transmit chains of the first network node is less than the number of receive chains of the first network node.

For instance, four receive chains require a corresponding number of pilot transmissions. Based on only two transmit chains, however, merely two pilot transmissions may be carried out at a time, requiring the pilot transmissions to be performed in at least two portions.

According to some embodiments, communicating the transmit configuration may further comprise an explicit signaling of a respective method of communicating the transmit configuration.

Advantageously, this may enable a flexible choice of transmit configuration.

Advantageously, the first network node may communicate the number of receive chains available for MIMO reception to the second network node. For instance, the first network node may be a user equipment, and the second network node may be a base station in a wireless mobile network.

Advantageously, the first network node may communicate a desired pre-coding to be performed by the second network node. For instance, the first network node may be a user equipment, and the second network node may be a base station in a wireless mobile network.

According to some embodiments, the identifying may be based on only those matrix entries of the spatial channel matrix exceeding a given significance threshold.

Advantageously, this may further simplify the identifying step.

According to some embodiments, the determining may comprise performing a singular value decomposition, SVD, of the respective spatial channel sub-matrix.

Advantageously, each SVD of a respective spatial channel sub-matrix yields an associated pre-coding configuration (i.e., eigenvector).

According to some embodiments, the selecting may comprise computing, for each determined candidate transmit configuration (i.e., eigenmode), a respective sum of squared singular values associated with the respective spatial channel sub-matrix.

According to some embodiments, the selecting may further comprise identifying the transmit configuration (eigenmode) from the determined candidate transmit configurations according to a largest respective computed sum of squared singular values.

In particular, the sum of the square of the singular values for a beam pair estimate corresponds to the sum of the eigenvalues of the inner product of the beam pair estimate:

$$\Sigma((svd(H))^2) = \Sigma(eig(H^{*T}H))$$

Advantageously, this may reduce complexity of finding an optimal transmit configuration in few steps based on beam sweeping. Less optimal ways could be based on iterative methods, being more time consuming and presumably involving more resources for sounding signals.

According to a second aspect, a network node is provided. The network node comprises a processor arranged for: participating, by a first network node, in a multiple input multiple output, MIMO, wireless transmission between the first network node and a second network node of a wireless network, the wireless transmission being associated with a spatial channel matrix; while participating in the MIMO wireless transmission: identifying, by the first network node and in the spatial channel matrix, at least one spatial channel sub-matrix having full rank; determining, by the first network node and for each identified spatial channel sub-matrix, a candidate transmit configuration for the second network node; selecting, by the first network node and from the determined candidate transmit configurations, a transmit configuration for the second network node; and configuring, by the first network node, the second network node to use the transmit configuration.

According to some embodiments, the network node may be configured to perform the method according to various embodiments.

Advantageously, the technical effects and advantages described above in relation with the method according to the first aspect equally apply to the network node having corresponding features.

According to some embodiments, the network node may be a user equipment, UE, of a wireless mobile network.

According to some embodiments, the network node may be a base station, BS, of a wireless mobile network.

According to a third aspect, a computer program is provided. The computer program comprises program code to be executed by at least one processor of a network node, whereby execution of the program code causes the network node to perform a method according to various embodiments.

According to a fourth aspect, a storage medium is provided. The storage medium stores computer-readable instructions that when executed by a computer cause the computer to perform a method according to various embodiments.

BRIEF DESCRIPTION OF THE DRAWINGS

Embodiments of the invention will be described with reference to the accompanying drawings, in which the same or similar reference numerals designate the same or similar elements.

DETAILED DESCRIPTION OF EMBODIMENTS

Exemplary embodiments of the invention will now be described with reference to the drawings. While some embodiments will be described in the context of specific fields of application, the embodiments are not limited to this field of application. Further, the features of the various embodiments may be combined with each other unless specifically stated otherwise.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication in a network are disclosed. For example, the network may be a cellular network including multiple cells, wherein each cell is defined by one or more BSs. Example network architectures include the 3GPP LTE architecture. According to 3GPP LTE, a wireless channel is defined according to the evolved UMTS Terrestrial Radio Access (EUTRAN). Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. In particular, such techniques may be applied in 3GPP NB-IoT or eMTC networks and 3GPP New Radio (NR) networks. Furthermore, respective techniques may be readily applied to various kinds of non-3GPP-specified architectures, such as Bluetooth, satellite communication, IEEE 802.11x Wi-Fi technology, etc.

Figure 1A:
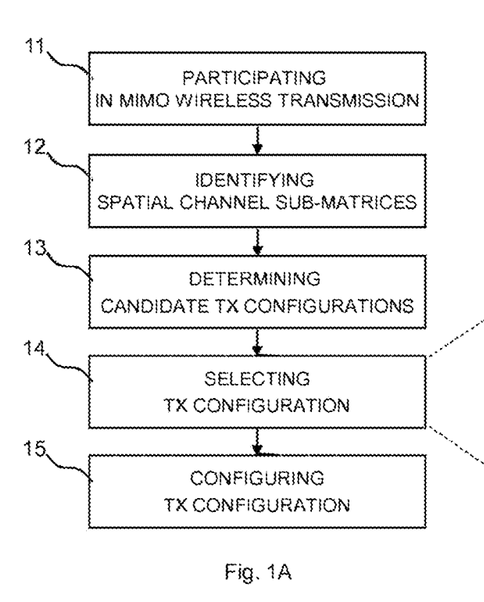
FIGS. 1A and 1B are schematic diagrams illustrating methods according to various embodiments.
Figure 1B:
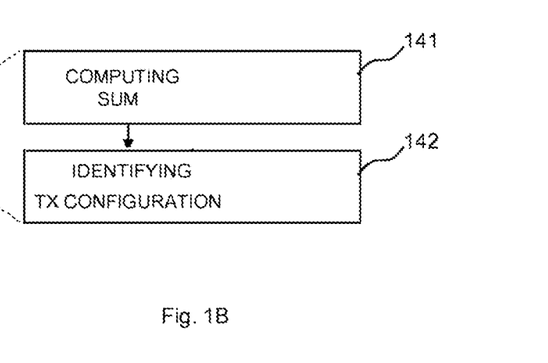

With reference to FIGS. 1A and 1B, methods 10 according to various embodiments are illustrated.

According to FIG. 1A, the method 10 comprises participating 11, by a first network node, in a MIMO wireless transmission between the first network node 20 and a second network node 30 of a wireless network 20, 30. The wireless transmission is associated with a spatial channel matrix 40.

The method 10 further comprises, while participating 11 in the MIMO wireless transmission: identifying 12, by the first network node 20 and in the spatial channel matrix 40, at least one spatial channel sub-matrix 41 having full rank.

The identifying 12 may be based on only those matrix entries of the spatial channel matrix 40 exceeding a given significance threshold.

The participating 11 in the MIMO wireless transmission between the first and second network nodes 20; 30 of the wireless network 20, 30 may comprise populating matrix entries of the spatial channel matrix 40 according to a respective signal propagation between a corresponding pair of transmit and receive beams formable in the MIMO wireless transmission. An example for a spatial channel matrix 40 will be provided in connection with FIG. 3 below.

The method 10 further comprises determining 13, by the first network node 20 and for each identified spatial channel sub-matrix 41, a candidate transmit configuration for the second network node 30.

The determining 13 may comprise performing a singular value decomposition of the respective spatial channel sub-matrix 41.

The method 10 further comprises selecting 14, by the first network node 20 and from the determined candidate transmit configurations, a transmit configuration for the second network node 30.

The transmit configuration may be indicative of a precoding configuration of the second network node 30 comprising at least one of an amplitude, a phase and a polarization of transmit beams suggested for use by the second network node 30.

According to FIG. 1B, the selecting 14 may comprise computing 141, for each determined candidate transmit configuration, a respective sum of squared singular values associated with the respective spatial channel sub-matrix 41.

The selecting 14 may further comprise identifying 142 the transmit configuration from the determined candidate transmit configurations according to a largest respective computed sum of squared singular values.

Reverting to FIG. 1A, the method 10 further comprises configuring 15, by the first network node 20, the second network node 30 to use the transmit configuration.

Configuring 15 the network node may further comprise communicating, by the first network node 20 and to the second network node 30, the transmit configuration.

Communicating the transmit configuration may comprise an explicit signaling of the transmit configuration.

Alternatively, communicating the transmit configuration may comprise an implicit signaling of the transmit configuration using pilot transmissions, by the first network node 20, in respective directions of transmit beams suggested for use by the second network node 30.

Communicating the transmit configuration may further comprise performing the pilot transmissions at least partially sequentially, if a number of transmit chains of the first network node 20 is less than the number of receive chains of the first network node 20.

Communicating the transmit configuration may further comprise an explicit signaling of a respective method of communicating the transmit configuration.

Figure 2:
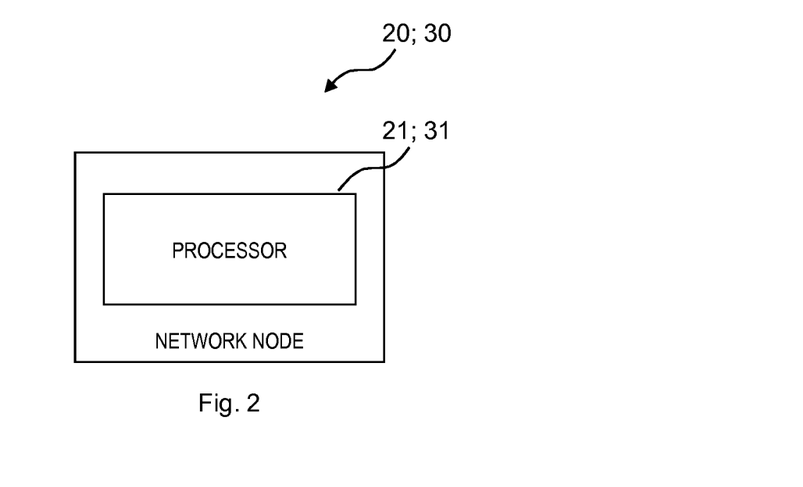
FIG. 2 is a schematic diagram for illustrating a network node according to an embodiment.

With reference to FIG. 2, a network node 20; 30 according to an embodiment is illustrated.

The network node 20; 30 comprises a processor 21; 31 being arranged for participating 11, by the network node 20; 30, in a MIMO wireless transmission between the network node 20 and a second network node 30 of a wireless network 20, 30. The wireless transmission is associated with a spatial channel matrix 40.

The processor 21; 31 is further arranged for, while participating 11 in the MIMO wireless transmission: identifying 12, by the network node 20 and in the spatial channel matrix 40, at least one spatial channel sub-matrix 41 having full rank.

The processor 21; 31 is further arranged for determining 13, by the network node 20 and for each identified spatial channel sub-matrix 41, a candidate transmit configuration for the second network node 30.

The processor 21; 31 is further arranged for selecting 14, by the network node 20 and from the determined candidate transmit configurations, a transmit configuration for the second network node 30.

The processor 21; 31 is further arranged for configuring 15, by the network node 20, the second network node 30 to use the transmit configuration.

The network node 20; 30 may be configured to perform the method 10 according to various embodiments.

The network node 20; 30 may be a user equipment, UE, 20 or a base station, BS, 30 of a wireless mobile network 20, 30.

Figure 3:
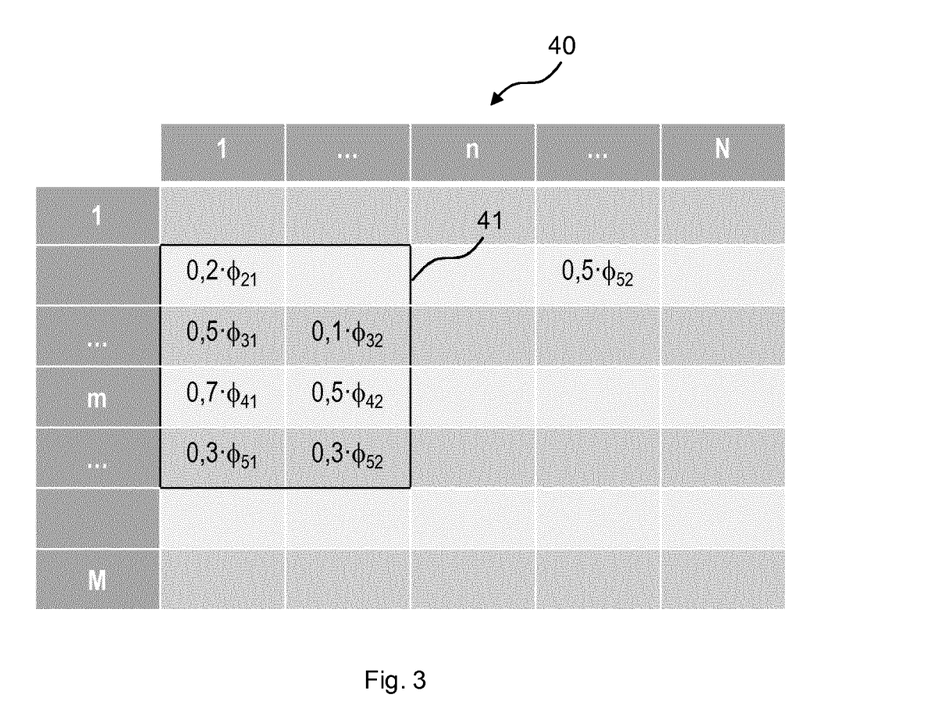
FIG. 3 is a schematic diagram illustrating a spatial channel matrix 40 and a spatial channel sub-matrix 41 according to examples.

With reference to FIG. 3, a spatial channel matrix 40 according to an example is illustrated.

The depicted M×N spatial channel matrix 40 is a tabular arrangement of N columns and M rows, corresponding to M receive beams of a network node, for example the second network node, and N transmit beams of another network node, for example the first network node.

Complex-valued matrix entries respectively describe a signal propagation between a corresponding pair of transmit and receive beams formable in the MIMO wireless transmission. For illustration, a matrix entry $h_{mn}$ in the depicted M×N spatial channel matrix may represent a relative gain and phase associated with transmit beam n and receive beam m.

Assuming beam reciprocity, i.e. a transmit beam corresponding to each receive beam at the respectively involved network nodes, the matrix entries may respectively describe a signal propagation of the MIMO wireless transmission in both directions.

The matrix entries of the spatial channel matrix 40 are being populated while the network nodes 20; 30 participate 11 in the MIMO wireless transmission, by means of beam sweeping.

Such beam sweeping in a MIMO wireless transmission between first and second network nodes 20; 30 is illustrated with reference to FIG. 4. It shows a system comprising first and second network nodes 20; 30 at left-hand and right-hand sides of the figure, each network node 20; 30 associated with a plurality of beams formable in the corresponding MIMO wireless transmission. Additionally, objects may be present which reflect radio signals.

The second network node 30 may perform transmit beam sweeps, where beams in different directions are allocated at different resources, in time/frequency domain. Each beam may include a synchronization signal, SS, downlink pilot, CSI-RS, phase reference signal, PRS, and a beam identifier. In addition, there are uplink resources where the first network node 20 is supposed to allocate its response when making contact. In each such resources, the second network node 30 can be assumed to receive in any beam direction.

For instance, the second network node 30 may perform a transmit beam sweep broadcasted to all UEs in a way that enables the first network node 20 to perform corresponding receive beam sweeps and to detect any beam pair as well as the corresponding signal propagation. The first network node will then be able to create a table which reflects the spatial channel matrix 41.

Figure 4:
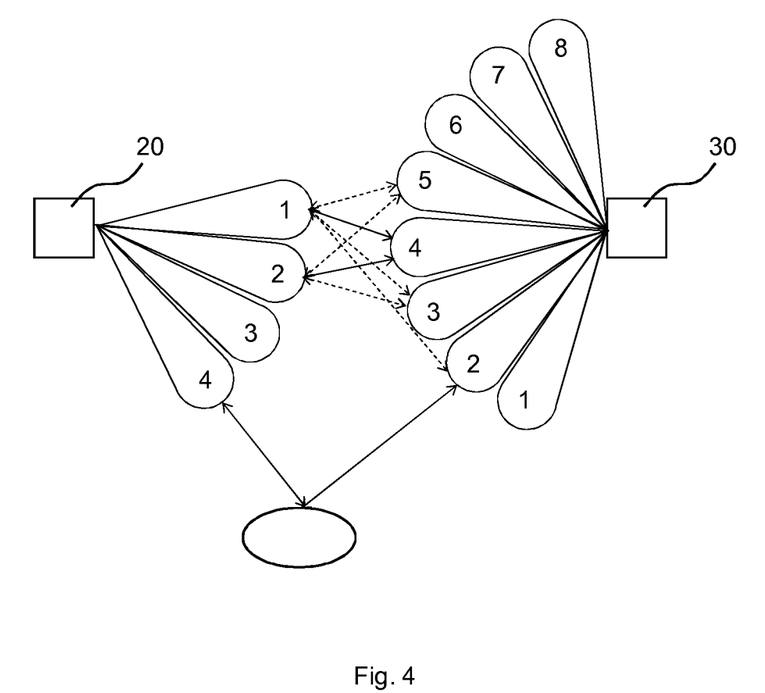
FIG. 4 is a schematic diagram illustrating beam sweeping in a MIMO wireless transmission according to an example.

In the example of FIG. 4, beam 4 of the second network node 30 is the strongest when the first network node 20 uses its beam 1. However, there is some incoming energy from beam 4 of the second network node 30 on beam 2 of the first network node 20 as well as from beam 2 of the second network node 30 on beam 4 of the first network node 20. In addition, there are some weaker signals present.

Reverting to FIG. 3, an illustrative spatial channel matrix 40 and an illustrative spatial channel sub-matrix 41 are indicated.

While the network nodes 20; 30 may form as many as N transmit and M receive beams in the example of FIG. 3, a number of transmit and/or receive chains of the involved network nodes 20; 30 may be more restricted.

A dimension of the sub-matrix is at least 2×2 to enable MIMO operation based on a plurality of beams, i.e. spatial multiplexing, and at most as large as the underlying M×N spatial channel matrix, but normally smaller owing to the restriction in the number of transmit and/or receive chains of the involved network nodes 20; 30.

Accordingly, in FIG. 3, the spatial channel sub-matrix 41 has a dimension of two columns and four rows, corresponding to two beams of the first network node and four beams of the second network node having values in excess of a significance threshold.

For example, if the first network node 20 has K<N transmit chains, a number of columns of the at least one spatial channel sub-matrix 41 corresponds to the number K of transmit chains of the first network node 20.

Similarly, in case of beam reciprocity, if the first network node 20 has K receive chains, the number of columns of the at least one spatial channel sub-matrix 41 corresponds to the number K of receive chains of the first network node 20. Thus according to FIG. 3, K=2.

In addition, further spatial channel sub-matrices 41 may be identified 12, which may, for example, comprise the intersections of columns 1 and 4 and rows 2-5, or columns 2 and 4 and rows 2-5, respectively.

Figure 5:
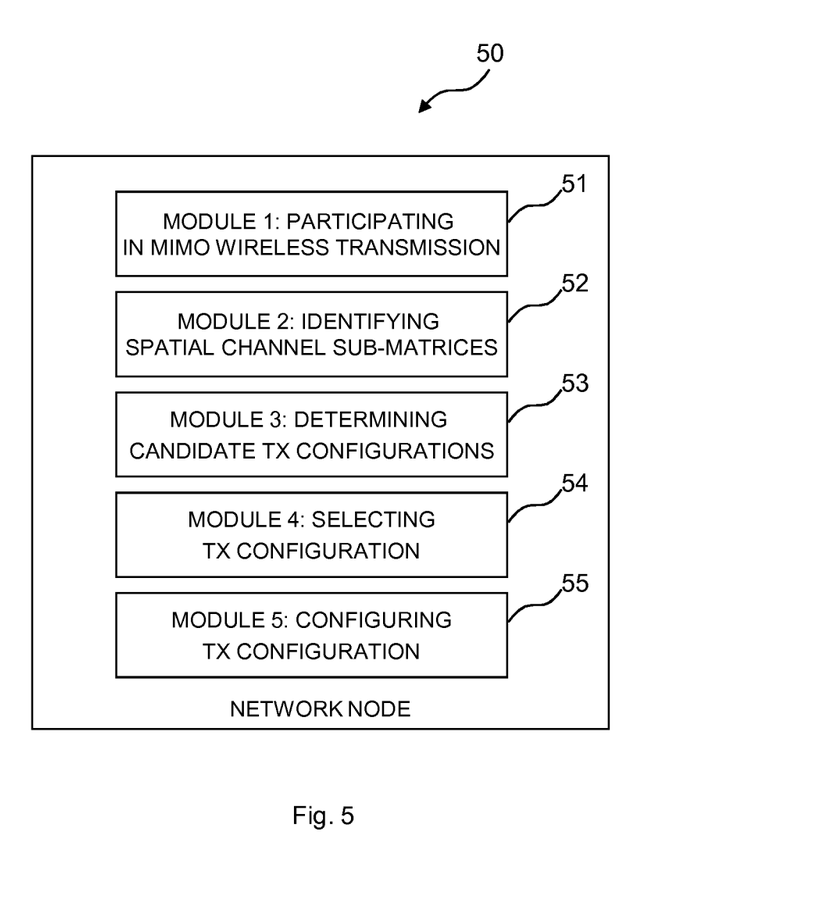
FIG. 5 is a block diagram illustrating functionalities of a network node according to an embodiment.

FIG. 5 is a block diagram illustrating functionalities of a network node 20; 30 which operates according to the method of FIG. 1A. The network node 20; 30 may for example correspond to the first network node 20 or to the second network node 30. As illustrated, the network node 20; 30 may be provided with a module 51 arranged for participating in a MIMO wireless transmission, such as explained in connection with step 11. Further, the network node 20; 30 may be provided with a module 52 arranged for identifying at least one spatial channel sub-matrix 41, such as explained in connection with step 12. Further, the network node 20; 30 may be provided with a module 53 arranged for determining a candidate transmit configuration, such as explained in connection with step 13. Further, the network node 20; 30 may be provided with a module 54 arranged for selecting a transmit configuration, such as explained in connection with step 14. Further, the network node 20; 30 may be provided with a module arranged for configuring the second network node 30 to use the transmit configuration, such as explained in connection with step 15.

It is noted that the network node 20; 30 may include further modules for implementing other functionalities, such as functionalities corresponding to the method steps 141 and 142 illustrated in FIG. 1B. Further, it is noted that the modules of the network node 20; 30 do not necessarily represent a hardware structure of the network node 20; 30, but may also correspond to functional elements, e.g., implemented by hardware, software, or a combination thereof.

Although the invention has been shown and described with respect to certain preferred embodiments, equivalents and modifications will occur to other skilled in the art upon the reading and understanding of the specification. The present invention includes all such equivalents and modifications and is limited only by the scope of the appended claims.

The invention claimed is:

1. A method, comprising:
    participating, by a first network node, in a multiple input multiple output, output (MIMO) wireless transmission between the first network node and a second network node of a wireless network, the wireless transmission being associated with a spatial channel matrix;
    while participating in the MIMO wireless transmission, identifying, by the first network node and in the spatial channel matrix, at least one spatial channel sub-matrix having full rank;
    determining, by the first network node and for each identified at least one spatial channel sub-matrix, a candidate transmit configuration for the second network node;
    selecting, by the first network node and from the determined candidate transmit configurations, a transmit configuration for the second network node; and
    configuring, by the first network node, the second network node to use the transmit configuration.

2. The method of claim 1, wherein:
    the participating in the MIMO wireless transmission between the first and second network nodes of the wireless network comprises populating matrix entries of the spatial channel matrix according to a respective signal propagation between a corresponding pair of transmit and receive beams formable in the MIMO wireless transmission.

3. The method of claim 1, wherein:
    a number of columns of the at least one spatial channel sub-matrix corresponds to a number of receive chains of the first network node.

4. The method of claim 1, wherein:
    the transmit configuration is indicative of a pre-coding configuration of the second network node comprising at least one of an amplitude, a phase and a polarization of transmit beams suggested for use by the second network node.

5. The method of claim 1, wherein:
    the configuring the network node further comprises communicating, by the first network node and to the second network node, the transmit configuration.

6. The method of claim 5, wherein:
    the communicating the transmit configuration comprises an explicit signaling of the transmit configuration.

7. The method of claim 5, wherein:
    the communicating the transmit configuration comprises an implicit signaling of the transmit configuration using pilot transmissions, by the first network node, in respective directions of transmit beams suggested for use by the second network node.

8. The method of claim 7, wherein:
    the communicating the transmit configuration comprises selectively, based on a number of transmit chains of the first network node being less than the number of receive chains of the first network node, performing the pilot transmissions at least partially sequentially.

9. The method of claim 5, wherein:
    the communicating the transmit configuration further comprises an explicit signaling of a respective method of communicating the transmit configuration.

10. The method of claim 1, wherein:
    the identifying is based on only those matrix entries of the spatial channel matrix exceeding a given significance threshold.

11. The method of claim 1, wherein:
    the determining comprises performing a singular value decomposition of the respective spatial channel sub-matrix.

12. The method of claim 1, wherein:
    the selecting comprises computing, for each determined candidate transmit configuration, a respective sum of squared singular values associated with the respective spatial channel sub-matrix.

13. The method of claim 1, wherein:
    the selecting further comprises identifying the transmit configuration from the determined candidate transmit configurations according to a largest respective computed sum of squared singular values.

14. A network node, comprising:
    a processor operable to execute program code causing the network node to perform a method comprising:
        participating, by the network node in a multiple input multiple output, output (MIMO) wireless transmission between the network node and a second network node of a wireless network, the wireless transmission being associated with a spatial channel matrix;
        while participating in the MIMO wireless transmission, identifying, by the network node and in the spatial channel matrix, at least one spatial channel sub-matrix having full rank;
        determining, by the network node and for each identified at least one spatial channel sub-matrix, a candidate transmit configuration for the second network node;
        selecting, by the network node and from the determined candidate transmit configurations, a transmit configuration for the second network node; and
        configuring, by the network node, the second network node to use the transmit configuration.

15. The network node of claim 14, wherein:
    the network node comprises a user, equipment (UE) of a wireless mobile network.

16. The network node of claim 14, wherein:
    the network node comprises a base station (BS) of a wireless mobile network.

17. The network node of claim 14, wherein:
    the processor is operable to execute the program code to cause the network node to perform the participating in the MIMO wireless transmission by:
        populating matrix entries of the spatial channel matrix according to a respective signal propagation between a corresponding pair of transmit and receive beams formable in the MIMO wireless transmission.

18. The network node of claim 14, wherein:
    the processor is operable to execute the program code to cause the network node to perform the identifying the at least one spatial channel sub-matrix by:
        identifying the at least one spatial channel sub-matrix based on only those matrix entries of the spatial channel matrix exceeding a given significance threshold.

19. The network node of claim 14, wherein:
the processor is operable to execute the program code to cause the network node to perform the determining the candidate transmit configuration for the second network node by:
performing a singular value decomposition of the respective spatial channel sub-matrix.

20. The network node of claim 14, wherein:
the processor is operable to execute the program code to cause the network node to perform the selecting the candidate transmit configuration for the second network node by:
identifying the transmit configuration from the determined candidate transmit configurations according to a largest respective computed sum of squared singular values.

\* \* \* \* \*